(12) United States Patent
Ookubo et al.

(10) Patent No.: US 7,088,769 B2
(45) Date of Patent: Aug. 8, 2006

(54) SIGNAL TRANSMISSION METHOD AND APPARATUS, AND SIGNAL TRANSMISSION SYSTEM

(75) Inventors: Ken' Iti Ookubo, Kanagawa (JP); Yoichi Toriumi, Tokyo (JP); Yoshinobu Kure, Kanagawa (JP)

(73) Assignee: Sony Corporation, Tokyo (JP)

( * ) Notice: Subject to any disclaimer, the term of this patent is extended or adjusted under 35 U.S.C. 154(b) by 894 days.

(21) Appl. No.: 10/079,595

(22) Filed: Feb. 19, 2002

(65) Prior Publication Data

US 2002/0114046 A1    Aug. 22, 2002

(30) Foreign Application Priority Data

Feb. 20, 2001  (JP)  .................. P2001-044059

(51) Int. Cl.
   *H04B 17/00*  (2006.01)
   *H03K 9/00*  (2006.01)
(52) U.S. Cl. .................. 375/225; 375/316; 375/327
(58) Field of Classification Search ................ 375/225, 375/354, 316, 327; 370/231, 282, 345.1, 370/468; 358/407–412, 440; 455/557
See application file for complete search history.

(56) References Cited

U.S. PATENT DOCUMENTS

| | | | | |
|---|---|---|---|---|
| 3,311,889 A * | 3/1967 | Birmingham et al. | ....... | 713/502 |
| 3,876,833 A * | 4/1975 | Breant | ......................... | 375/360 |
| 4,809,303 A * | 2/1989 | Barndt, Sr. | .................. | 375/361 |
| 5,351,134 A * | 9/1994 | Yaguchi et al. | ............. | 358/435 |
| 5,509,050 A * | 4/1996 | Berland | ....................... | 455/557 |
| 5,530,696 A * | 6/1996 | Boggs et al. | ................ | 370/252 |
| 6,292,920 B1 * | 9/2001 | Nakano | ........................ | 714/774 |
| 6,337,886 B1 * | 1/2002 | Asahi | .......................... | 375/316 |
| 6,389,476 B1 * | 5/2002 | Olnowich | .................... | 709/233 |
| 6,438,159 B1 * | 8/2002 | Uber et al. | .................. | 375/225 |
| 6,633,541 B1 * | 10/2003 | Hijikata et al. | ............. | 370/231 |
| 2002/0122477 A1 * | 9/2002 | Murata | ........................ | 375/225 |
| 2003/0202572 A1 * | 10/2003 | Giddens et al. | ............. | 375/225 |

* cited by examiner

*Primary Examiner*—Emmanuel Bayard
*Assistant Examiner*—Lawrence B. Williams
(74) *Attorney, Agent, or Firm*—Frommer Lawrence & Haug LLP; William S. Frommer; Thomas F. Presson

(57) ABSTRACT

An apparatus/system and a method for optical fiber two-way communication, which enables highly reliable transmission at all times in order to carry out communication at a high transmission speed when an optical fiber or a combination of optical fibers not assumed are used. A signal is transmitted with a predetermined pattern corresponding to each of a plurality of different signal transmission speeds from the signal transmitter of a first terminal to the signal receiver of a second terminal. It is then compared by the signal receiver of the second terminal with a signal of the predetermined pattern. A signal transmission speed is detected which enables transmission and reception on the basis of a signal position where the signal received by the signal receiver of the second terminal and the signal of the predetermined pattern do not coincide with each other.

27 Claims, 6 Drawing Sheets

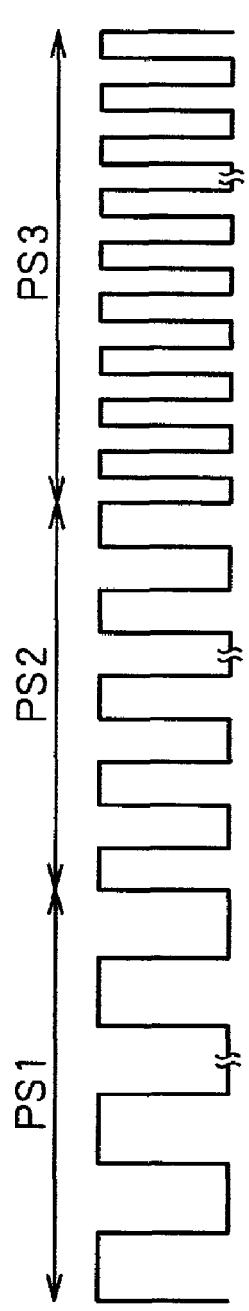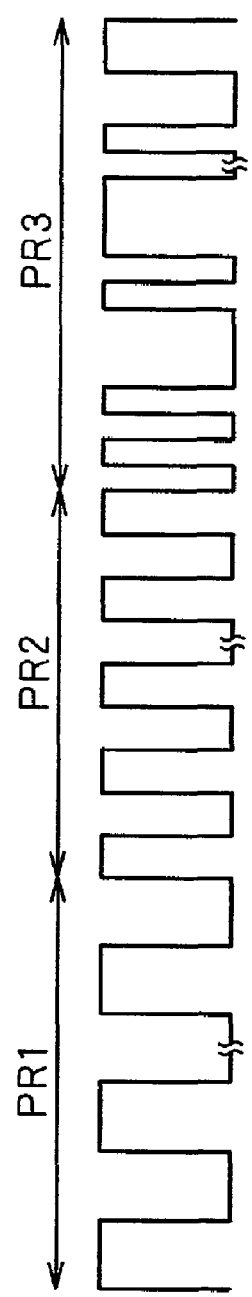
FIG. 2A TRANSMISSION SIGNAL
FIG. 2B RECEIVED AND REPRODUCED SIGNAL

SIGNAL TRANSMISSION METHOD AND APPARATUS, AND SIGNAL TRANSMISSION SYSTEM

BACKGROUND OF THE INVENTION

The present invention relates to a method and an apparatus for signal transmission suitable for use in a system capable of transmitting and receiving a signal at a plurality of signal transmission speeds in accordance with an IEEE1394 standard, for example, and a signal transmission system.

Conventionally, with respect to signal transmission speed of an optical fiber two-way communication system, for example, capable of transmitting a signal at a plurality of signal transmission speeds, consideration has been primarily given only to speeds handled by a transmitter and a receiver connected to both ends of an optical fiber, while an optical fiber having a characteristic of higher-speed transmission than the speeds handled by the transmitter and receiver connected to both ends of the optical fiber has been used.

According to a method of determining a transmission speed by a transmission protocol defined in an IEEE (Institute of Electrical and Electronics Engineers) 1394. a draft, as an example of a method of determining signal transmission speed in consideration of the speeds handled by the transmitter and receiver connected to both ends of the optical fiber, each of the transmitter and receiver connected to both ends of the optical fiber compares its maximum transmission speed, or a capacity of the apparatus, with a maximum transmission speed of the other apparatus, to determine the lower maximum transmission speed as the maximum communication speed to be shared between the apparatus.

The maximum transmission speed shared between the optical transmitter and receiver connected to both ends of the optical fiber in the system transmitting and receiving a signal using the optical fiber as described above is determined by capacity of a light source such as a laser diode (LD) or a light emitting diode (LED) and capacity of a circuit for driving the light source in the case of the optical transmitter. In the case of the optical receiver, on the other hand, the maximum transmission speed is determined by capacity of a light receiving unit such as a photodetector (PD), a circuit system connected to the light receiving unit, and the like. The optical fiber is used as a transmission line between the optical transmitter and receiver on condition that the optical fiber has a characteristic of higher-speed transmission than the speeds handled by the transmitter and receiver connected to both ends of the optical fiber, and has a length within a range allowing normal transmission of signals.

According to the IEEE1394 standard, transmission is made basically by using two pairs of twisted-pair lines, and the transmission method is so-called half-duplex communication using both the two pairs of twisted-pair lines for one-way transmission. This communication method uses a communication technique referred to as DS coding, which sends data in one pair of the twisted-pair lines and a signal referred to as strobe in the other pair of the twisted-pair lines, and then reproduces a clock on the receiving side by obtaining an exclusive disjunction of the two signals. The IEEE1394 standard currently defines three speeds: 98.304 Mbps (S100), 196.608 Mbps (S200), and 393.216 Mbps (S400) as maximum transmission speed (data rate), and specifies so-called upward compatibility, which means that an apparatus capable of a high rate needs to support an apparatus (node) having a lower rate.

Recently, there have been cases of putting an optical fiber compliant with the IEEE1394 standard to practical use, in which an AV apparatus, a personal computer and the like for a general household, for example, are networked by using the optical fiber compliant with the IEEE1394 standard. Therefore, it is to be expected that there will be increasing uses hereafter in which various household apparatus are networked and thus a general consumer (general user) himself/herself connects the various apparatus freely and arbitrarily by using an optical fiber. Furthermore, with the networking of such household apparatus, various optical fibers are expected to be commercialized hereafter.

However, when a general user, or a non-engineer, connects the various apparatus freely and arbitrarily by using the various optical fibers, as described above, it is quite conceivable that actual signal communication cannot be carried out even if the apparatus are physically connectable.

Specifically, in general, when constructing a communication network system, an engineer constructs the network after adequate consideration of characteristics of a transmission line and various apparatus of the network system. However, when a general user connects the various household apparatus freely and arbitrarily by using the various optical fibers, as described above, an optical fiber other than optical fibers assumed by a designer of each of the apparatus at the time of design may be used, or a combination of optical fibers not assumed by the designer at the time of design may be used, for example. The use of the optical fibers not assumed by the designer may result in impossibility of communication.

More specifically, it is quite conceivable that when a multimode optical fiber longer than was assumed by the designer at the time of design is used, for example, or an optical fiber formed by combining a plurality of multimode optical fibers with each other, for example, not assumed at the time of design is used, a signal may not be transmitted or received because of a characteristic mismatch between the apparatus and the optical fiber, even if communication is possible in principle. Specifically, when a relatively long multimode optical fiber is used or a plurality of optical fibers are combined with each other, or especially when a plurality of multimode optical fibers are combined with each other, not only does transmission loss become greater, but a communication speed enabling transmission is also limited by mode dispersion to a lower level than when a short optical fiber is used. A bandwidth (B) of a step index fiber is expressed by the following expression:

$$B \propto c/(n\Delta L)$$

where n is an index of refraction; Δ is dispersion; c is the speed of light; and L is length of the fiber. This expression indicates that as the length L of the fiber is increased, the transmission bandwidth B is decreased. The above is described in literature such for example as "New Edition Optical Fiber Transmission: Noda et al., the Institute of Electronics and Communication Engineers of Japan (Corona Publishing), p58 (1984)," "An Introduction to Optical Fiber Communication: Suematsu et al., Ohmsha, p213 (1989) ISDN 4-274-03266-3," and "Plastic Optical Fiber: POF Consortium (Kyoritsu Shuppan), p23 (1997) ISDN 4-320-08545-0."

In addition, because of the above, the system will be user-friendlier if notifying the user that communication is not possible when actual signal communication cannot be carried out.

SUMMARY OF THE INVENTION

The present invention has been made in view of the above problems, and it is accordingly an object of the present invention to provide a method and an apparatus for signal transmission and a signal transmission system that make it possible to make highly reliable transmission at all times and to carry out communication at a high transmission speed when a transmission line other than transmission lines (for example optical fibers) assumed at the time of design is used, or a combination of transmission lines not assumed at the time of design is used, as long as the transmission line or the transmission lines are connected in a state allowing communication in principle, and also make it possible to inform the user that communication is not possible when actual signal communication cannot be carried out.

According to a first aspect of the present invention, there is provided a signal transmission method for a signal transmission system, the signal transmission system having at least a signal transmitter capable of transmitting at a plurality of signal transmission speeds, a signal receiver capable of receiving at a plurality of signal transmission speeds, and a signal transmission line for connection between the signal transmitter and the signal receiver, the signal transmission method including the steps of: transmitting a signal of a predetermined pattern corresponding to each of a plurality of different signal transmission speeds from the signal transmitter of a first terminal to the signal receiver of a second other opposite terminal; comparing the signal received by the signal receiver of the second terminal with a signal of the predetermined pattern; and detecting a signal transmission speed enabling transmission and reception on the basis of a signal position where the signal received by the signal receiver of the second terminal and the signal of the predetermined pattern do not coincide with each other.

According to a second aspect of the present invention, there is provided a signal transmission method for a signal transmission system, the signal transmission system having at least signal transmitters capable of transmitting at a plurality of signal transmission speeds, signal receivers capable of receiving at a plurality of signal transmission speeds, and a signal transmission line for connection between the signal transmitters and the signal receivers, the signal transmission method including the steps of: transmitting a signal of a predetermined pattern corresponding to each of a plurality of different signal transmission speeds from the signal transmitter of a first terminal to the signal receiver of a second other opposite terminal; comparing the signal received by the signal receiver of the second terminal with a signal of the predetermined pattern; detecting a first signal transmission speed enabling transmission and reception on the basis of a signal position where the signal received by the signal receiver of the second terminal and the signal of the predetermined pattern do not coincide with each other; transmitting a signal of a predetermined pattern corresponding to each of a plurality of different signal transmission speeds from the signal transmitter of the second terminal to the signal receiver of the first terminal; comparing the signal received by the signal receiver of the first terminal with a signal of the predetermined pattern; and detecting a second signal transmission speed enabling transmission and reception on the basis of a signal position where the signal received by the signal receiver of the first terminal and the signal of the predetermined pattern do not coincide with each other.

According to a third aspect of the present invention, there is provided a signal transmission system for transmitting and receiving a signal using a transmission line capable of transmitting a signal at a plurality of signal transmission speeds, the signal transmission system including: a first terminal including at least: pattern generating means for generating a signal of a predetermined pattern corresponding to each of a plurality of different signal transmission speeds; and transmitting means for transmitting the generated signal of the predetermined pattern; and a second terminal including at least: receiving means for receiving the signal of the predetermined pattern transmitted from the transmitting means of the first terminal; comparing means for comparing the signal received by the receiving means with a signal of the predetermined pattern; and transmission speed detecting means for detecting a signal transmission speed enabling transmission and reception on the transmission line on the basis of a signal position where the signal received by the receiving means and the signal of the predetermined pattern do not coincide with each other.

According to a fourth aspect of the present invention, there is provided a signal transmission system for transmitting and receiving a signal using a transmission line capable of transmitting a signal at a plurality of signal transmission speeds, the signal transmission system including: a first terminal including at least: pattern generating means for generating a signal of a predetermined pattern corresponding to each of a plurality of different signal transmission speeds; transmitting means for transmitting the generated signal of the predetermined pattern; receiving means for receiving a signal of the predetermined pattern transmitted via the transmission line; comparing means for comparing the signal received by the receiving means with the generated signal of the predetermined pattern; and transmission speed detecting means for detecting a first signal transmission speed enabling transmission and reception on the transmission line on the basis of a signal position where the signal received by the receiving means and the generated signal of the predetermined pattern do not coincide with each other; and a second terminal including at least: pattern generating means for generating a signal of a predetermined pattern corresponding to each of a plurality of different signal transmission speeds; transmitting means for transmitting the generated signal of the predetermined pattern; receiving means for receiving a signal of the predetermined pattern transmitted via the transmission line; comparing means for comparing the signal received by the receiving means with the generated signal of the predetermined pattern; and transmission speed detecting means for detecting a second signal transmission speed enabling transmission and reception on the transmission line on the basis of a signal position where the signal received by the receiving means and the generated signal of the predetermined pattern do not coincide with each other.

According to a fifth aspect of the present invention, there is provided a signal transmission apparatus for use in a signal transmission system, the signal transmission system transmitting and receiving a signal using a transmission line capable of transmitting a signal at a plurality of signal transmission speeds, the signal transmission apparatus including at least: pattern generating means for generating a signal of a predetermined pattern corresponding to each of a plurality of different signal transmission speeds; transmitting means for transmitting the generated signal of the predetermined pattern; receiving means for receiving a signal of the predetermined pattern transmitted via the transmission line; comparing means for comparing the signal received by the receiving means with the generated signal of the predetermined pattern; and transmission speed detecting means for detecting a signal transmission speed enabling transmission and reception on the transmission line on the basis of a signal position where the signal received by the receiving means and the generated signal of the predetermined pattern do not coincide with each other.

The above and the other objects, features and advantages of the present invention will be apparent from the following detailed description of the preferred embodiments of the invention in conjunction with the accompanying drawings.

BRIEF DESCRIPTION OF THE DRAWINGS

FIGS. 2A and 2B are waveform diagrams of assistance in explaining transmission signals and received and reproduced signals for a transmission speed test;

DETAILED DESCRIPTION OF THE PREFERRED EMBODIMENTS

Preferred embodiments of the present invention will hereinafter be described with reference to the drawings.

Figure 1:
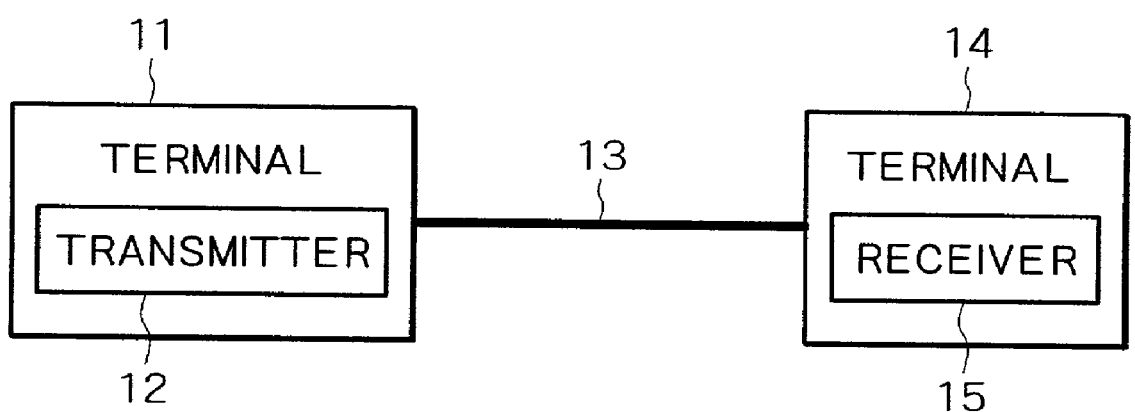
FIG. 1 is a block diagram showing a system configuration according to a first embodiment of the present invention.

A first embodiment of the present invention will first be described. FIG. 1 shows a schematic configuration of a first embodiment of an optical signal transmitting and receiving system capable of transmitting and receiving a signal at a plurality of signal transmission speeds using an optical fiber 13.

In the optical signal transmitting and receiving system shown in FIG. 1, a terminal 11 and a terminal 14 are connected to each other via a step index type multimode all-plastic optical fiber 13, for example. Although the system connecting the terminal 11 and the terminal 14 with each other using the optical fiber 13 is in a connecting state capable of communication in principle at this point, suppose that it is not clear whether actual communication is possible and which of the signal transmission speeds enables highly reliable signal transmission when the communication is possible.

For a test to determine whether actual communication is possible and which of the signal transmission speeds enables highly reliable signal transmission when the communication is possible, the system according to the first embodiment first transmits a transmission signal for the transmission speed test as shown in FIG. 2A, for example, from a transmitter 12 of the terminal 11 to a receiver 15 of the terminal 14 via the optical fiber 13.

The transmission signal for the transmission speed test shown in FIG. 2A is formed by pulse trains of a plurality of predetermined patterns in which a basic pulse repetition rate changes in correspondence with each of the plurality of different signal transmission speeds. The patterns of the pulse train are sequentially outputted from the transmitter 12 of the terminal 11 in order of increasing signal transmission speed, that is, starting with the pattern of the pulse train having the lowest basic pulse repetition rate. More specifically, a signal PS1 formed by a pulse train of a predetermined pattern corresponding to the lowest signal transmission speed (the pattern of the pulse train having the lowest basic pulse repetition rate) is first transmitted from the transmitter 12 of the terminal 11, followed by a signal PS2 formed by a pulse train of a predetermined pattern corresponding to the next lowest signal transmission speed (the pattern of the pulse train having the next lowest basic pulse repetition rate), and then a signal PS3 formed by a pulse train of a predetermined pattern corresponding to the highest signal transmission speed (the pattern of the pulse train having the highest basic pulse repetition rate). Thus, the signal PS1 formed by the pulse train of the predetermined pattern corresponding to the lowest signal transmission speed to the signal PS3 formed by the pulse train of the predetermined pattern corresponding to the highest signal transmission speed are sequentially transmitted from the transmitter 12 of the terminal 11. It is to be noted that while FIG. 2A shows an example of the three signals PS1 to PS3 (that is, three signal transmission speeds), the present invention is not limited to this; for example, pulse trains of predetermined patterns corresponding to a speed higher than that of the signal PS3 and a speed lower than that of the signal PS1 may be transmitted from the transmitter 12 of the terminal 11 as transmission signals for the transmission speed test in order of increasing speed. Also, in the first embodiment, for simplicity of illustration and description, the predetermined patterns of the transmission signals for the transmission speed test are simple pulse trains in which only the basic pulse repetition rate is changed, as shown in FIG. 2A. In practice, however, a pattern formed by pulses that tend to cause an error such as symbol interference is used. This is because more highly reliable transmission is possible when a pattern formed by pulses that tend to cause an error such as symbol interference is used to find a signal transmission speed at which no error occurs during transmission, as described later.

The receiver 15 of the terminal 14 having received the transmission signals for the transmission speed test shapes waveforms of the received signals and thereby sequentially detects (reproduces) the pulse trains. A reading clock for the waveform shaping is set to have a speed one to several times the maximum reading speed of the receiver 15. Phase synchronization is obtained from the first several reproduced clocks, for example. Suppose that the received and reproduced signals thus received and reproduced by the waveform shaping are pulse train signals PR1, PR2, and PR3 as shown in FIG. 2B, for example.

Generally, in a transmission system using an optical fiber such as the system according to the first embodiment, a signal waveform tends to be changed due to various factors such for example as dispersion effects as the basic pulse repetition rate is increased, and consequently it is difficult for the receiver to reproduce a signal identical with a transmission signal from the transmitter. This phenomenon also tends to occur as length of the optical fiber is increased. In addition, a signal waveform may be changed easily depending on a pulse pattern of the transmitted signal. The pulse patterns of the transmission signals for the transmission speed test in the first embodiment are the predetermined patterns as shown in FIG. 2A.

Thus, the receiver 15 of the terminal 14 generates the predetermined patterns and compares the predetermined patterns with the patterns of the pulse trains of the received and reproduced signals actually received and reproduced by the receiver 15 of the terminal 14 to determine whether the predetermined patterns coincide in shape with the patterns of the pulse trains of the received and reproduced signals. The maximum transmission speed of signals reproducible by the receiver 15 of the terminal 14 can be thereby obtained from a signal transmission speed corresponding to the pattern of a pulse train that does not coincide with the predetermined pattern. Specifically, a signal transmission speed lower than the signal transmission speed corresponding to the pattern of the pulse train of a received and reproduced signal that does not coincide with the predetermined pattern enables reliable transmission and reception of signals. Furthermore, by using the maximum signal transmission speed among the signal transmission speeds at which the transmission and reception of signals are possible, it is possible to obtain the maximum signal transmission speed at which the receiver 15 of the terminal 14 can reproduce a signal.

When description is made more specifically with reference to FIGS. 2A and 2B, in a case where the signals transmitted from the transmitter 12 of the terminal 11 are formed by the pulse trains of the plurality of predetermined patterns corresponding to the plurality of different signal transmission speeds in order of increasing speed, respectively, as shown in FIG. 2A, while the signals received by the receiver 15 of the terminal 14 are the received and reproduced signals as shown in FIG. 2B, a comparison between the predetermined patterns of FIG. 2A and the patterns of the received and reproduced signals of FIG. 2B indicates that the transmission signal PS1 and the received and reproduced signal PR1 coincide in shape with each other, and the transmission signal PS2 and the received and reproduced signal PR2 coincide with each other, whereas the transmission signal PS3 and the received and reproduced signal PR3 do not coincide with each other. Hence, in the case of FIGS. 2A and 2B, the signal transmission speed corresponding to the transmission signal PS2 and the received and reproduced signal PR2 is the maximum signal transmission speed at which highly reliable transmission of the system of FIG. 1 is possible.

In this case, the maximum signal transmission speed at which the highly reliable transmission is possible (speed corresponding to the signals PR2 and PS2) can be determined by counting backward from the signals (PR3 and PS3) whose patterns do not coincide with each other.

The receiver 15 counts the number of pulses of the received and reproduced signal from a start of reception of the signal and then determines the maximum signal transmission speed on the basis of the pulse count value, for example. Specifically, the number of pulses included within each of the patterns corresponding to their respective signal transmission speeds mentioned above is a known number, and therefore counting the number of pulses from the head of the signal gives the signal transmission speed corresponding to the count value. Accordingly, the receiver 15 can determine the maximum signal transmission speed by counting the number of pulses of the received and reproduced signal from a start of reception of the signal, obtaining a count value at a point where the patterns do not coincide with each other, counting backward from the count value, and thereby obtaining the signal transmission speed corresponding to patterns preceding the above patterns that do not coincide with each other.

The receiver 15 can also obtain a time elapsed from a time at which a first pulse of the received and reproduced signal from a start of reception of the signal was detected, and then determine the maximum signal transmission speed on the basis of the elapsed time. Specifically, the time from the first pulse to each of the patterns corresponding to their respective signal transmission speeds mentioned above is known, and therefore measuring the time elapsed from the first pulse gives the signal transmission speed corresponding to the elapsed time. Accordingly, the receiver 15 can determine the maximum signal transmission speed by measuring a time elapsed from the time of detection of the first pulse, obtaining an elapsed time at a point where the patterns do not coincide with each other, counting backward from the elapsed time, and thereby obtaining the signal transmission speed corresponding to patterns preceding the above patterns that do not coincide with each other.

A second embodiment of the present invention will next be described.

Figure 3:
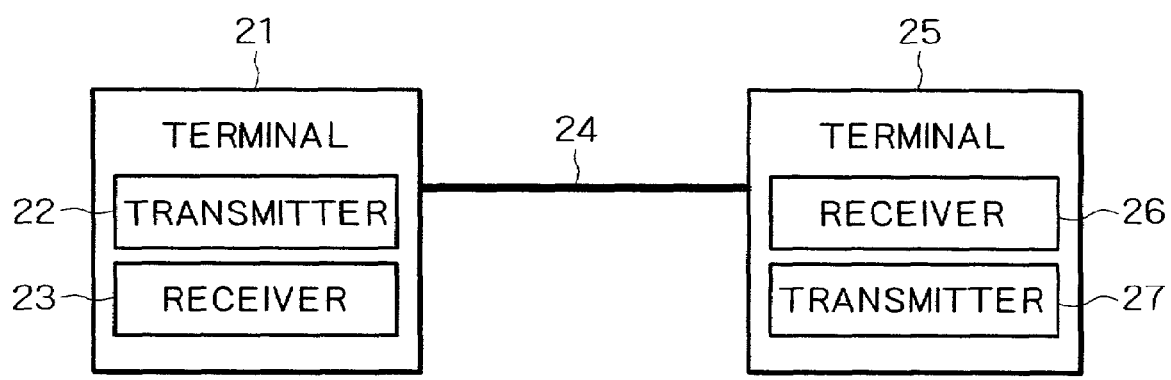
FIG. 3 is a block diagram showing a system configuration according to a second embodiment of the present invention.

FIG. 3 shows a schematic configuration of a second embodiment of an optical signal transmitting and receiving system capable of transmitting and receiving a signal at a plurality of signal transmission speeds using an optical fiber 24.

In the optical signal transmitting and receiving system shown in FIG. 3, a terminal 21 and a terminal 25 are connected to each other via a step index type multimode all-plastic optical fiber 24, for example. Also in the second embodiment, as in the first embodiment, although the system connecting the terminal 21 and the terminal 25 with each other using the optical fiber 24 is in a connecting state capable of communication in principle at this point, suppose that it is not clear whether actual communication is possible and which of the signal transmission speeds enables highly reliable signal transmission when the communication is possible.

For a test to determine whether actual communication is possible and which of the signal transmission speeds enables highly reliable signal transmission when the communication is possible, the system according to the second embodiment first transmits the same transmission signal for the transmission speed test as shown in FIG. 2A from a transmitter 22 of the terminal 21 to a receiver 26 of the terminal 25 (this direction will hereinafter be referred to as a normal direction) via the optical fiber 24.

As with the receiver 15 in FIG. 1, the receiver 26 of the terminal 25 having received the transmission signal for the transmission speed test shapes a waveform of the received signal and thereby sequentially detects (reproduces) pulse trains, generates the predetermined patterns described above, and compares the predetermined patterns with the patterns of the pulse trains of the received and reproduced signal actually received and reproduced by the receiver 26 of the terminal 25 to determine whether the predetermined patterns coincide in shape with the patterns of the pulse trains of the received and reproduced signal, whereby a maximum transmission speed V1 of signals reproducible by the receiver 26 of the terminal 25 is obtained.

The system according to the second embodiment also transmits the same transmission signal for the transmission speed test as shown in FIG. 2A from a transmitter 27 of the terminal 25 to a receiver 23 of the terminal 21 (this direction will hereinafter be referred to as a reverse direction) via the optical fiber 24.

As with the receiver 15 in FIG. 1, the receiver 23 of the terminal 21 having received the transmission signal for the transmission speed test shapes a waveform of the received signal and thereby sequentially detects (reproduces) pulse trains, generates the predetermined patterns described above, and compares the predetermined patterns with the patterns of the pulse trains of the received and reproduced signal actually received and reproduced by the receiver 23 of the terminal 21 to determine whether the predetermined patterns coincide in shape with the patterns of the pulse trains of the received and reproduced signal, whereby a maximum transmission speed V2 of signals reproducible by the receiver 23 of the terminal 21 is obtained.

Thereafter, the maximum signal transmission speeds V1 and V2 detected by the terminals 21 and 25 are compared with each other, and then the lower signal transmission speed (the speed considered to achieve higher reliability) is used as the maximum signal transmission speed in transmission of signals in the normal direction and the reverse direction of the system according to the second embodiment.

The transmission of signals in the normal direction and the reverse direction for the signal transmission speed test may be carried out at the same time, or the signal transmission speed test in the reverse direction may be carried out after the signal transmission speed test in the normal direction is completed. In the latter case, the transmission signals for the signal transmission speed test when transmitted in the reverse direction may be limited up to the pulse train of a pattern corresponding to the maximum signal transmission speed (V1) obtained by the signal transmission test in the normal direction (that is, the transmission signals may be shortened). The thus shortened transmission signals in the reverse direction make it possible to shorten a time required to detect the maximum signal transmission speed in the normal direction and the reverse direction to be obtained in the end.

The optical fibers used in the embodiments of the present invention may be one-core or two-core optical fibers, and are not limited in length. Incidentally, too long an optical fiber will only result in a great transmission loss and impossibility of signal transmission.

According to the systems according to the embodiments of the present invention described above, even when an optical fiber other than optical fibers assumed by a designer of an optical transmission system and an optical transmission apparatus at the time of design is used, or a combination of optical fibers not assumed by the designer is used, a signal transmission test is actually carried out at various speeds with a combination of the optical fiber, an optical transmitter, and an optical receiver to obtain a maximum transmission speed at which transmission is possible. Therefore, it is possible to carry out highly reliable communication at a high transmission speed. Specifically, when a multimode optical fiber longer than that was assumed by the designer at the time of design is used, for example, or an optical fiber formed by combining a plurality of multimode optical fibers with each other, for example, not assumed at the time of design is used, a transmission speed rendering transmission possible is obtained at all times as long as the optical fiber is connected in a state allowing communication in principle. Furthermore, when a plurality of signal transmission speeds can be used, it is possible to obtain the maximum signal transmission speed of the signal transmission speeds.

In addition, when it is found that a combination of an optical fiber, an optical transmitter, and an optical receiver is not capable of communication in principle even when the signal transmission speed is decreased to a lowest level, the embodiments of the present invention can detect a state in which communication between the optical transmitter and the optical receiver connected to both ends of the optical fiber is not possible. Therefore, when the systems of the embodiments notify the user of this state, the user can readily understand that the combination is not capable of communication. Thus a user-friendly system can be constructed. It is quite conceivable that communication may not be possible with an optical fiber connected, especially when household appliances are networked and various optical fibers are commercialized hereafter so that a general consumer, or a non-engineer, connects household appliances freely and arbitrarily. Even in such cases, it is possible to ensure that the user understands that the combination of the appliances and the optical fiber cannot carry out communication.

Figure 4:
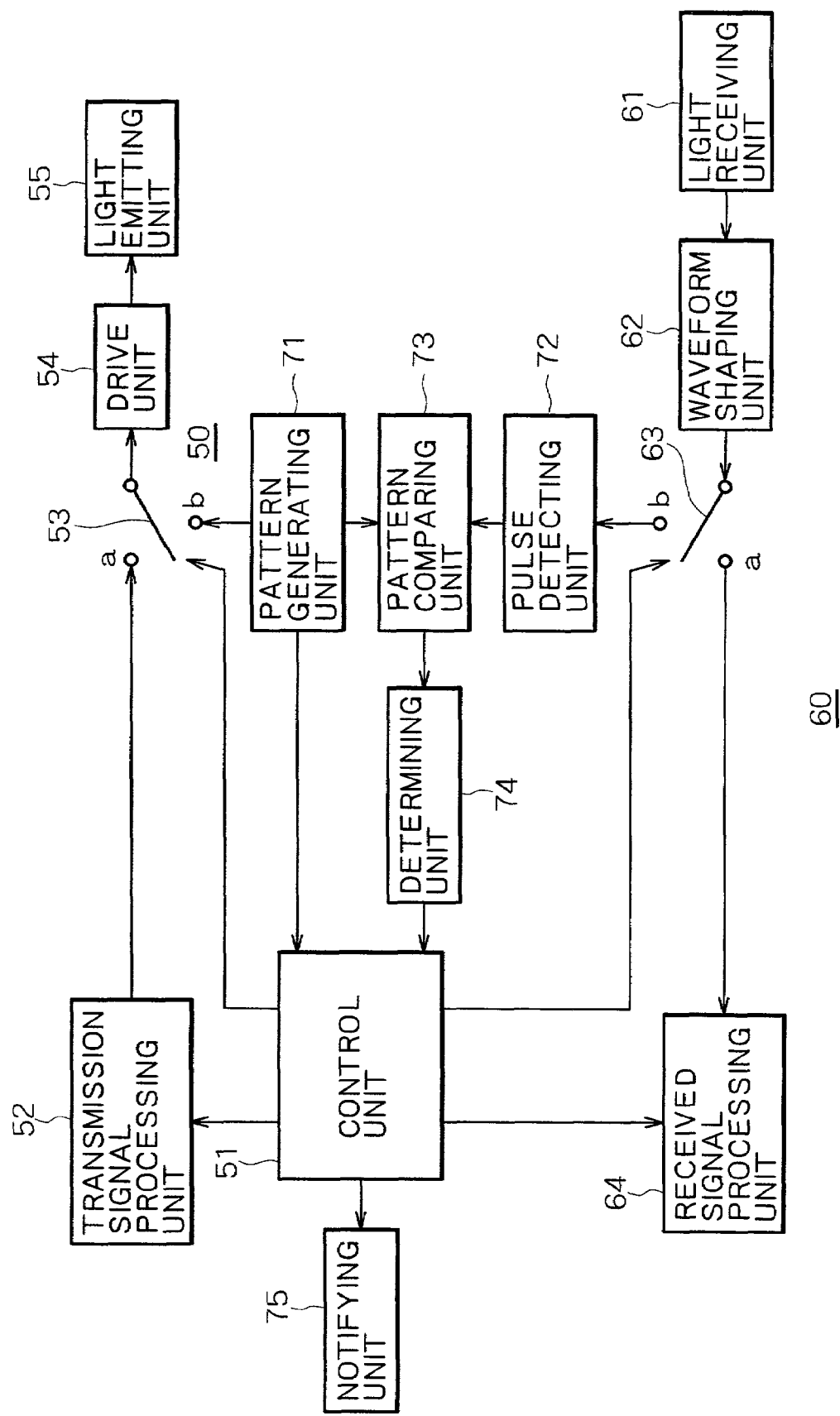
FIG. 4 is a diagram showing a concrete configuration of a transmitting unit and a receiving unit of a terminal.

Next, FIG. 4 shows a concrete configuration of each of the terminals described above with reference to FIG. 3. In FIG. 4, a transmitting unit 50 corresponds to the transmitters 22 and 27 in FIG. 3, and a receiving unit 60 corresponds to the receivers 23 and 26 in FIG. 3. FIG. 4 shows a configuration example in which the transmitting unit and the receiving unit are formed integrally with each other; however, the transmitting unit and the receiving unit may be formed separately from each other. The transmitter 12 in FIG. 1 is formed in substantially the same manner as the transmitting unit 50 in FIG. 4, and the receiver 15 in FIG. 1 is formed in substantially the same manner as the receiving unit 60 in FIG. 4.

A control unit 51 in FIG. 4 is formed by a CPU, for example, and controls the whole transmitting and receiving operation of the terminals. A transmission signal processing unit 52 performs processing such as coding and modulation on a signal to be transmitted when actual data transmission (primary data transmission other than at the time of the transmission speed test) is made. The transmission signal outputted from the transmission signal processing unit 52 when the actual data transmission is made is sent to a selector switch 53.

The selector switch 53 is controlled in switch operation by the control unit 51, and is turned to a switching terminal a side during the actual data transmission.

A drive unit 54 drives a light emitting unit 55 formed by a laser oscillator (LD) or a light emitting diode (LED) according to the transmission signal from the selector switch 53.

The light emitting unit 55 thereby emits transmission light in accordance with the transmission signal. The transmission light is sent from an optical fiber not shown in the figure to a terminal at the other transmission end.

On the other hand, a light receiving unit 61 formed by a photodetector (PD), for example, receives transmission light sent from a transmitting unit of the terminal at the other end via the optical fiber not shown in the figure, and then sends the received signal to a waveform shaping unit 62.

The waveform shaping unit 62 shapes a waveform of the received signal. The received signal after the waveform shaping is sent to a selector switch 63.

As with the selector switch 53, the selector switch 63 is controlled in switch operation by the control unit 51, and is turned to a switching terminal a side during actual data reception (primary data reception other than at the time of the transmission speed test).

A received signal processing unit 64 performs processing such as demodulation and decoding on the received signal from the selector switch 63.

Thus, it becomes possible to reproduce the signal sent from the terminal at the other end.

The operations described above are for normal data transmission and reception. During the transmission speed test, the selector switches 53 and 63 are each turned to a switching terminal b side under control of the control unit 51.

During the transmission speed test, the control unit 51 also operates a pattern generating unit 71 to generate transmission signals for the transmission speed test formed by the plurality of predetermined patterns as described with reference to FIG. 2A. The transmission signals for the transmission speed test outputted from the pattern generating unit 71 are sent to the drive unit 54 via the selector switch 53 turned to the switching terminal b side.

The drive unit 54 drives the light emitting unit 55 according to the transmission signals from the selector switch 53. The light emitting unit 55 thereby emits transmission light in accordance with the transmission signals for the transmission speed test. The transmission light is sent from the optical fiber not shown in the figure to the terminal at the other transmission end.

On the other hand, during the transmission speed test, the light receiving unit 61 receives transmission light in accordance with transmission signals for the transmission speed test sent from the terminal at the other end, and then sends the received signals to the waveform shaping unit 62.

The received signals after being subjected to the waveform shaping by the waveform shaping unit 62 are sent to a pulse detecting unit 72 via the selector switch 63 turned to the switching terminal b side.

The pulse detecting unit 72 sequentially detects (reproduces) pulse trains from the received signals for the transmission speed test, and then sends the detected pulse trains to a pattern comparing unit 73.

The pattern comparing unit 73 is also supplied with pulse trains of the predetermined patterns for the transmission speed test generated by the pattern generating unit 71. The pattern comparing unit 73 compares the predetermined patterns generated by the pattern generating unit 71 with signal patterns formed by the pulse trains detected from the received signals, and then sends a signal indicating coincidence/non-coincidence of the patterns to a determining unit 74.

The determining unit 74 determines a maximum signal transmission speed by using the signal indicating coincidence/non-coincidence sent from the pattern comparing unit 73, and a pulse count value or a time elapsed from a first received pulse as described above, for example. Information of the maximum signal transmission speed obtained by the determining unit 74 is sent to the control unit 51.

The control unit 51 controls the transmission signal processing of the transmission signal processing unit 52 to the maximum signal transmission speed, and controls the received signal processing of the received signal processing unit 64 to the maximum signal transmission speed. It is thus possible to make highly reliable signal transmission and reception at a higher signal transmission speed.

When the determining unit 74 determines that communication is not possible at any transmission speed, the control unit 51 controls a notifying unit 75 formed by a display or a warning lamp, for example, on the basis of the determination information from the determining unit 74 to notify the user that communication is not possible (by displaying a warning on the display or blinking the warning lamp, for example). Incidentally, it is also possible to notify the user of the maximum signal transmission speed obtained by the above determination when communication is possible.

Figure 5:
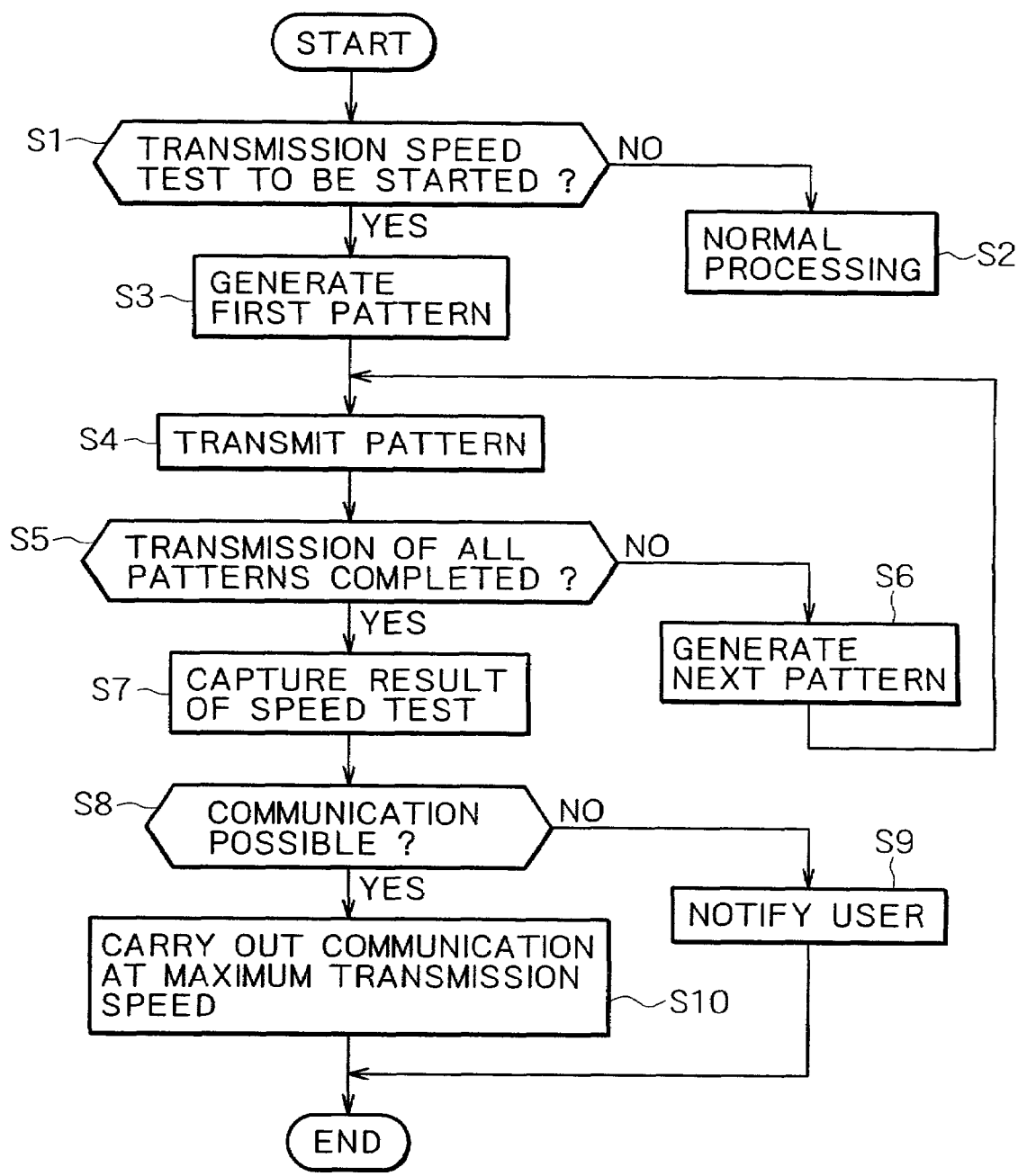
FIG. 5 is a flowchart showing a flow of operation of the transmitting unit.

Next, FIG. 5 shows a flow of operation of the transmitting unit 50 formed as shown in FIG. 4.

As processing at a step S1 in FIG. 5, the control unit 51 first determines whether to start the transmission speed test on the basis of an operation of connecting the optical fiber or information such as an instruction from a user, for example. When the control unit 51 determines at the step S1 that the transmission speed test is not to be carried out, the control unit 51 turns the selector switch 53 to the switching terminal a side and controls the transmission signal processing unit 52 to perform normal data transmission processing, as processing at a step S2. On the other hand, when the control unit 51 determines at the step S1 that the transmission speed test is to be carried out, the control unit 51 turns the selector switch 53 to the switching terminal b side and controls the pattern generating unit 71 to generate a transmission signal formed of a predetermined pattern for the transmission speed test, as processing at a step S3.

The transmission signal of the predetermined pattern for the transmission speed test generated by the pattern generating unit 71 is sent to the terminal at the other transmission end via the drive unit 54 and the light emitting unit 55 at a step S4.

The control unit 51 next determines at a step S5 whether all of the predetermined patterns for the transmission speed test as described above have been transmitted. When all of the predetermined patterns have not been transmitted, the control unit 51 controls the pattern generating unit 71 to generate a next pattern as processing at a step S6, and then returns to the processing at the step S4.

After the control unit 51 determines at the step S5 that all of the patterns have been transmitted, on the other hand, the control unit 51 captures information on a result of the transmission speed test obtained by the processing of the pattern comparing unit 73 and the determining unit 74 at a step S7, and then determines whether communication is possible on the basis of the information at a step S8. When the control unit 51 determines at the step S8 that communication is not possible, the control unit 51 uses the notifying unit 75 to notify the user that communication is not possible at a step S9.

Figure 6:
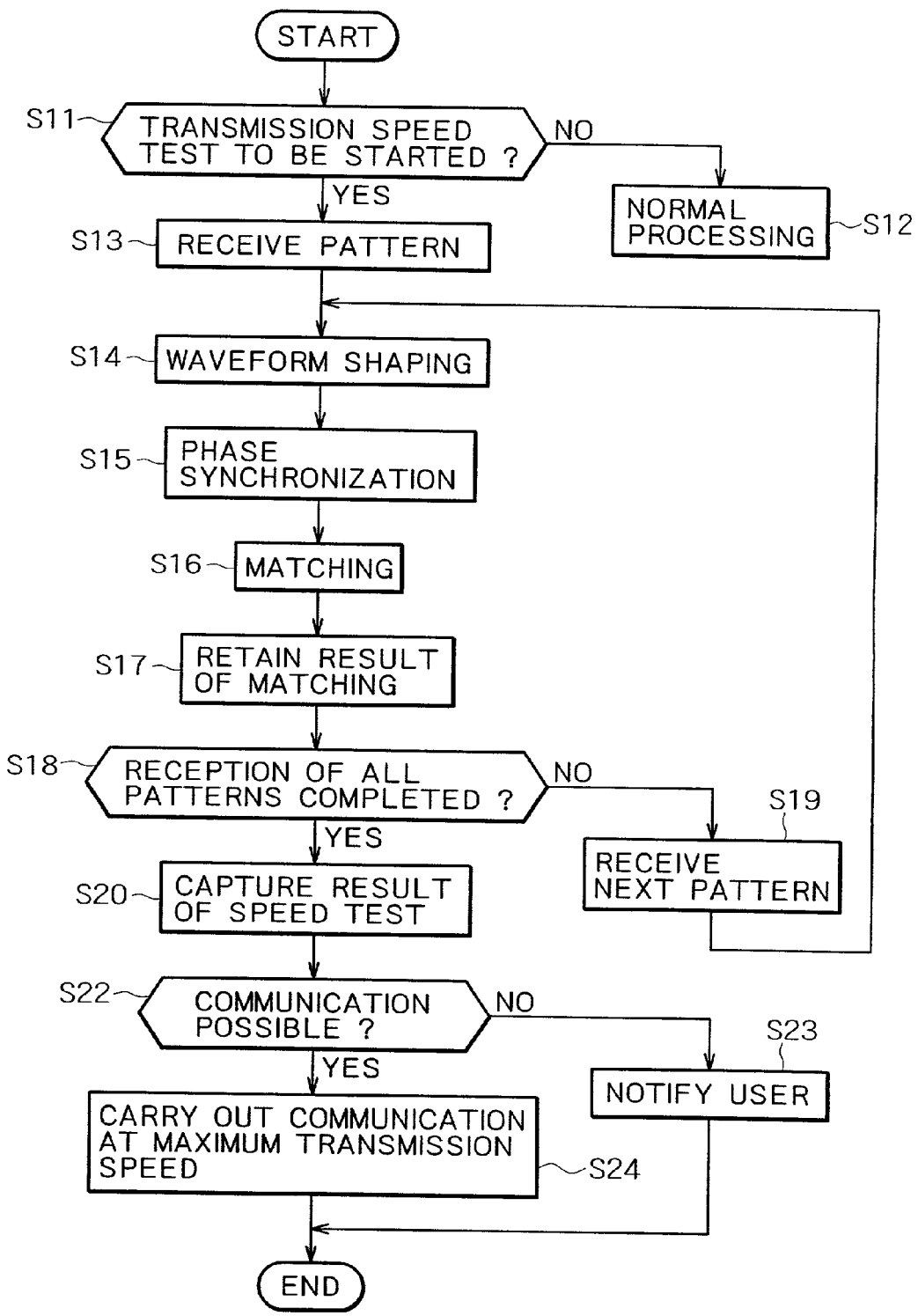
FIG. 6 is a flowchart showing a flow of operation of the receiving unit.

When the control unit 51 determines at the step S8 that communication is possible, on the other hand, the control unit 51 controls the transmission signal processing unit 52 and the like so that communication is carried out at a maximum signal transmission speed among transmission speeds allowing communication at a step S10 Next, FIG. 6 shows a flow of operation of the receiving unit 60 formed as shown in FIG. 4.

As processing at a step S11 in FIG. 6, the control unit 51 first determines whether to start the transmission speed test on the basis of an operation of connecting the optical fiber or information such as an instruction from a user, for example. When the control unit 51 determines at the step S11 that the transmission speed test is not to be carried out, the control unit 51 turns the selector switch 63 to the switching terminal a side and controls the received signal processing unit 62 to perform normal data reception processing, as processing at a step S12.

When the control unit 51 determines at the step S11 that the transmission speed test is to be carried out, on the other hand, the control unit 51 turns the selector switch 63 to the switching terminal b side as processing at a step S13. At this point, the light receiving unit 61 receives signal light of a pattern for the transmission speed test from the terminal at the other end as processing at the step S13. The waveform shaping unit 62 shapes a waveform of the received signal as processing at a step S14. The pulse detecting unit 72 carries out phase synchronization and pulse detection as processing at a step S15.

Then, the pattern comparing unit 73 performs pattern comparison (pattern matching) as described above at a step S16. Resulting information on coincidence/non-coincidence is retained by the determining unit 74 at a step S17.

As processing at a step S18, the control unit 51 determines whether all of the patterns for the transmission speed test have been received. When all of the patterns have not been received, the control unit 51 effects control to receive a next pattern as processing at a step S19, and then returns to the processing at the step S14.

After the control unit 51 determines at the step S18 that all of the patterns have been received, on the other hand, the control unit 51 captures information on a result of the transmission speed test obtained by the processing of the pattern comparing unit 73 and the determining unit 74 at a step S20, and then determines whether communication is possible on the basis of the information at a step S22. When the control unit 51 determines at the step S22 that communication is not possible, the control unit 51 uses the notifying unit 75 to notify the user that communication is not possible at a step S23.

When the control unit 51 determines at the step S22 that communication is possible, on the other hand, the control unit 51 controls the received signal processing unit 64 and the like so that communication is carried out at a maximum signal transmission speed among transmission speeds allowing communication at a step S24.

It is to be noted that the embodiments have been described by taking as an example a case where signal transmission speeds are tested in the transmission speed test in increasing order of speed; however, the signal transmission speeds may of course be tested in reverse order, that is, decreasing order of speed, or the order of the signal transmission speeds may be arbitrary order other than the increasing order and the decreasing order as long as the order is known in advance.

In addition, the embodiments have been described by taking as an example a case where the maximum signal transmission speed is obtained as the signal transmission speed for use in communication between the terminals, as described above; however, any signal transmission speed may be used as long as the signal transmission speed allows communication. For example, in the case of FIG. 3, it is also possible to carry out communication using the maximum signal transmission speed V1 when transmitting a signal from the transmitter 22 of the terminal 21 to the receiver 26 of the terminal 25, and carry out communication using the maximum signal transmission speed V2 when transmitting a signal from the transmitter 27 of the terminal 25 to the receiver 23 of the terminal 21. Furthermore, the embodiments have been described by taking an optical fiber as an example of a transmission line. However, the present invention is not limited to an optical fiber, and is applicable to a system using any transmission line such as an electric wire or radio waves as long as the system has a plurality of signal transmission speeds.

The present invention transmits a signal of a predetermined pattern corresponding to each of a plurality of different signal transmission speeds from a signal transmitter of a first terminal to a signal receiver of a second other opposite terminal, compares the signal received by the signal receiver of the second terminal with a signal of the predetermined pattern, and detects a signal transmission speed enabling transmission and reception on the basis of a signal position where the received signal and the signal of the predetermined pattern do not coincide with each other. Therefore, when a transmission line having characteristics other than those of transmission lines (for example optical fibers) assumed at the time of design is used, or a combination of transmission lines not assumed at the time of design is used, for example, it is possible to make highly reliable transmission at all times as long as the transmission line or the transmission lines are connected in a state allowing communication in principle, and also it is possible to carry out communication at a high transmission speed. In addition, the present invention can inform the user that communication is not possible when actual signal communication cannot be carried out, by notifying the user that a signal cannot be transmitted or received even when using any of the detected signal transmission speed enabling transmission and reception and the plurality of signal transmission speeds.

While the preferred embodiments of the present invention have been described using the specific terms, such description is for illustrative purposes only, and it is to be understood that changes and variations may be made without departing from the spirit or scope of the following claims.

What is claimed is:

1. A signal transmission method for a signal transmission system, said signal transmission system having at least a signal transmitter capable of transmitting at a plurality of signal transmission speeds, a signal receiver capable of receiving at a plurality of signal transmission speeds, and a signal transmission line for connection between said signal transmitter and said signal receiver, said signal transmission method comprising the steps of:

transmitting a signal of a predetermined pattern corresponding to each of a plurality of different signal transmission speeds from said signal transmitter of a first terminal to said signal receiver of a second other opposite terminal;

receiving transmission light in accordance with the signal received by said signal receiver;

comparing the signal received by said signal receiver of said second terminal with a signal of said predetermined pattern;

sending said signal received by said signal receiver to a waveform shaping unit; and detecting a signal transmission speed enabling transmission and reception on the basis of a signal position where the signal received by said signal receiver of said second terminal and the signal of said predetermined pattern do not coincide with each other.

2. A signal transmission method as claimed in claim 1, wherein said detected signal transmission speed is used as a signal transmission speed in communication between said first terminal and said second terminal.

3. A signal transmission method as claimed in claim 1, wherein a maximum signal transmission speed enabling said transmission and reception among said plurality of signal transmission speeds is detected on the basis of the signal position where the signal received by said signal receiver of said second terminal and the signal of said predetermined pattern do not coincide with each other.

4. A signal transmission method as claimed in claim 1, wherein a time elapsed from a time at which a first pulse is detected provides said signal position.

5. A signal transmission method as claimed in claim 1, wherein a notification is provided indicating that signal transmission and reception cannot be carried out.

6. A signal transmission method for a signal transmission system, said signal transmission system having at least signal transmitters capable of transmitting at a plurality of signal transmission speeds, signal receivers capable of receiving at a plurality of signal transmission speeds, and a signal transmission line for connection between said signal transmitters and said signal receivers, said signal transmission method comprising the steps of:

transmitting a signal of a predetermined pattern corresponding to each of a plurality of different signal transmission speeds from said signal transmitter of a first terminal to said signal receiver of a second other opposite terminal;

receiving transmission light in accordance with the signal received by said signal receiver of a second other opposite terminal;

comparing the signal received by said signal receiver of said second terminal with a signal of said predetermined pattern;

sending said signal received by said signal receiver of said second terminal to a waveform shaping unit;

detecting a first signal transmission speed enabling transmission and reception on the signal position where the signal received by said signal receiver of said second terminal and the signal of said predetermined pattern do not coincide with each other;

transmitting a signal of a predetermined pattern corresponding to each of a plurality of different signal transmission speeds from said signal transmitter of said second terminal to said signal receiver of said first terminal;

receiving transmission light in accordance with the signal received by said signal receiver of said first terminal;

comparing the signal received by said signal receiver of said first terminal with a signal of said predetermined pattern;

sending said signal received by said signal receiver of said first terminal to a waveform shaping unit; and detecting a second signal transmission speed enabling transmission and reception on the basis of a signal position where the signal received by said signal receiver of said first terminal and the signal of said predetermined pattern do not coincide with each other.

7. A signal transmission method as claimed in claim 6, wherein a lower signal transmission speed of said first signal transmission speed and said second signal transmission speed is used as a signal transmission speed in comnunication between said first terminal and said second terminal.

8. A signal transmission method as claimed in claim 6, wherein said first signal transmission speed is used as a signal transmission speed in signal transmission from said first terminal to said second terminal; and
said second signal transmission speed is used as a signal transmission speed in signal transmission from said second terminal to said first terminal.

9. A signal transmission method as claimed in claim 6, wherein a maximum signal transmission speed enabling said transmission and reception among said plurality of signal transmission speeds is detected as said first signal transmission speed on the basis of the signal position where the signal received by said signal receiver of said second terminal and the signal of said predetermined pattern do not coincide with each other; and
a maximum signal transmission speed enabling said transmission and reception among said plurality of signal transmission speeds is detected as said second signal transmission speed on the basis of the signal position where the signal received by said signal receiver of said first terminal and the signal of said predetermined pattern do not coincide with each other.

10. A signal transmission method as claimed in claim 6, wherein a time elapsed from a time at which a first pulse is detected provides said signal position.

11. A signal transmission method as claimed in claim 6, wherein a notification is provided indicating that signal transmission and reception cannot be carried out.

12. A signal transmission system for transmitting and receiving a signal using a transmission line capable of transmitting a signal at a plurality of signal transmission speeds, said signal transmission system comprising:
a first terminal including at least: pattern generating means for generating a signal of a predetermined pattern corresponding to each of a plurality of different signal transmission speeds; and transmitting means for transmitting said generated signal of the predetermined pattern;
a second terminal including at least: receiving means for receiving the signal of said predetermined pattern transmitted from said transmitting means of said first terminal; light receiving means for receiving transmission light in accordance with the signal received by said receiving means: comparing means for comparing the signal received by said receiving means with a signal of said predetermined pattern; sending means for sending said signal received by said receiving means to a waveform shaping means; and transmission speed detecting means for detecting a signal transmission speed enabling transmission and reception on said transmission line on the basis of a signal position where the signal received by said receiving means and the signal of said predetermined pattern do not coincide with each.

13. A signal transmission system as claimed in claim 12, wherein said detected signal transmission speed is used as a signal transmission speed in communication between said first terminal and said second terminal.

14. A signal transmission system as claimed in claim 12, wherein said transmission speed detecting means detects a maximum signal transmission speed enabling said transmission and reception among said plurality of signal transmission speeds on the basis of the signal position where the signal received by said receiving means of said second terminal and the signal of said predetermined pattern do not coincide with each other.

15. A signal transmission system as claimed in claim 12, wherein said transmission speed detecting means detects a time elapsed from a first pulse as said signal position.

16. A signal transmission system as claimed in claim 12, wherein said second terminal further includes notifying means for providing a notification that signal transmission and reception cannot be carried out.

17. A signal transmission system for transmitting and receiving a signal using a transmission line capable of transmitting a signal at a plurality of signal transmission speeds, said signal transmission system comprising:
a first terminal including at least: pattern generating means for generating a signal of a predetermined pattern corresponding to each of a plurality of different signal transmission speeds; transmitting means for transmitting said generated signal of the predetermined pattern; receiving means for receiving a signal of said predetermined pattern transmitted via said transmission line; light receiving means for receiving transmission light in accordance with the signal received by said receiving means; comparing means for comparing the signal received by said receiving means with the generated signal of said predetermined pattern; sending means for sending said signal received by said receiving means to a waveform shaping means; and transmission speed detecting means for detecting a first signal transmission speed enabling transmission and reception on said transmission line on the basis of a signal position where the signal received by said receiving means and the generated signal of said predetermined pattern do not coincide with each other;

a second terminal including at least: pattern generating means for generating a signal of a predetermined pattern corresponding to each of a plurality of different signal transmission speeds; transmitting means for transmitting said generated signal of the predetermined pattern; receiving means for receiving a signal of said predetermined pattern transmitted via said transmission line; light receiving means for receiving transmission light in accordance with the signal received by said receiving means; comparing means for comparing the signal received by said receiving means with the generated signal of said predetermined pattern; sending means for sending said signal received by said receiving means to a waveform shaping means; and transmission speed detecting means for detecting a second signal transmission speed enabling transmission and reception on said transmission line on the basis of a signal position where the signal received by said receiving means and the generated signal of said predetermined pattern do not coincide with each other.

18. A signal transmission system as claimed in claim 17, wherein a lower signal transmission speed of said first signal transmission speed and said second signal transmission speed is used as a signal transmission speed in communication between said first terminal and said second terminal.

19. A signal transmission system a claimed in claim 17, wherein said first signal transmission speed is used as a signal transmission speed in signal transmission from said first terminal to said second terminal; and
said second signal transmission speed is used as a signal transmission speed in signal transmission from said second terminal to said first terminal.

20. A signal transmission system as claimed in claim 17, wherein a maximum signal transmission speed enabling said transmission and reception among said plurality of signal transmission speeds is detected as said first signal transmission speed on the basis of the signal position where the signal received by said receiving means of said second terminal and the generated signal of said predetermined pattern do not coincide with each other; and
a maximum signal transmission speed enabling said transmission and reception among said plurality of signal transmission speeds is detected as said second signal transmission speed on the basis of the signal position where the signal received by said receiving means of said first terminal and the generated signal of said predetermined pattern do not coincide with each other.

21. A signal transmission system as claimed in claim 17, wherein a time elapsed from a time at which a first pulse is detected provides said signal position.

22. A signal transmission system as claimed in claim 17, wherein said first terminal and said second terminal further include notifying means for providing a notification that signal transmission and reception cannot be carried out.

23. A signal transmission apparatus for use in a signal transmission system, said signal transmission system transmitting and receiving a signal using a transmission line capable of transmitting a signal at a plurality of signal transmission speeds, said signal transmission apparatus comprising at least:

pattern generating means for generating a signal of a predetermined pattern corresponding to each of a plurality of different signal transmission speeds;

transmitting means for transmitting said generated signal of the predetermined pattern;

receiving means for receiving a signal of said predetermined pattern transmitted via said transmission line;

light receiving means for receiving transmission light in accordance with the signal received by said receiving means;

comparing means for comparing the signal received by said receiving means with the generated signal of said predetermined pattern;

sending said signal received by said receiving means to a waveform shaping means; and transmission speed detecting means for detecting a signal transmission speed enabling transmission and reception on said transmission line on the basis of a signal position where the signal received by said receiving means and the generated signal of said predetermined pattern do not coincide with each other.

24. A signal transmission apparatus as claimed in claim 23,
wherein said detected signal transmission speed is used as a signal transmission speed to be shared in communication between said signal transmission apparatus and another terminal via said transmission line.

25. A signal transmission apparatus as claimed in claim 23,
wherein said transmission speed detecting means detects a maximum signal transmission speed enabling said transmission and reception among said plurality of signal transmission speeds on the basis of the signal position where the signal received by said receiving means and the generated signal of said predetermined pattern do not coincide with each other.

26. A signal transmission apparatus as claimed in claim 23,
wherein said transmission speed detecting means detects a time elapsed from a first pulse as said signal position.

27. A signal transmission apparatus as claimed in claim 23, further including notifying means for providing a notification that signal transmission and reception cannot be carried out.

* * * * *